Dec. 23, 1941.  A. M. WOLF  2,267,388

STABILIZING MEANS FOR MOTOR VEHICLES

Original Filed April 15, 1933

INVENTOR.
Austin M. Wolf,
BY
M. C. Lyddane
ATTORNEY.

Patented Dec. 23, 1941

2,267,388

UNITED STATES PATENT OFFICE 2,267,388

STABILIZING MEANS FOR MOTOR VEHICLES

Austin M. Wolf, Plainfield, N. J.

Original application April 15, 1933, Serial No. 666,332. Divided and this application November 27, 1939, Serial No. 306,298

5 Claims. (Cl. 280—87)

This invention relates to stabilizing means for motor vehicles, the subject matter of the present application constituting a division of my pending application for Patent Ser. No. 666,332 filed April 15, 1933, now Patent No. 2,181,161, November 28, 1939.

Generically considered, it is the object of my present invention to provide means for controlling and modifying the resistance of vehicle shock absorbers in anticipation of the effect of centrifugal force upon the body of the vehicle in making sharp turns or rounding corners.

More particularly, I provide means controlled from the steering wheel of the vehicle for properly adjusting the resistance control valves of the shock absorbers at the outer side of the vehicle in making a turn so as to increase the resistance of said shock absorbers to the compression of the vehicle body supporting springs on that side of the vehicle, in making a turn, whereby the effects of centrifugal force on the vehicle body are snubbed or nullified.

A further object of the invention is to provide two independently operable means connected respectively with the resistance control valves of the shock absorbers on opposite sides of the vehicle, and a common actuating means therefor operatively connected with the vehicle steering mechanism.

It is a further object of the invention in one embodiment thereof to provide electrical means for actuating the resistance regulating valves of the shock absorbers and means controlled by the steering mechanism of the vehicle for selectively energizing the electrical valve operating means of the shock absorbers on opposite sides of the vehicle.

With the above and other objects in view, the invention consists in the improved stabilizing means for motor vehicles, and in the form, construction and relative arrangement of its several parts, as will hereinafter be more fully described, illustrated in the accompanying drawing and subsequently incorporated in the subjoined claims.

In the drawing wherein I have illustrated several practical examples of the present invention and in which corresponding reference characters designate similar parts throughout the several views.

Figure 1:
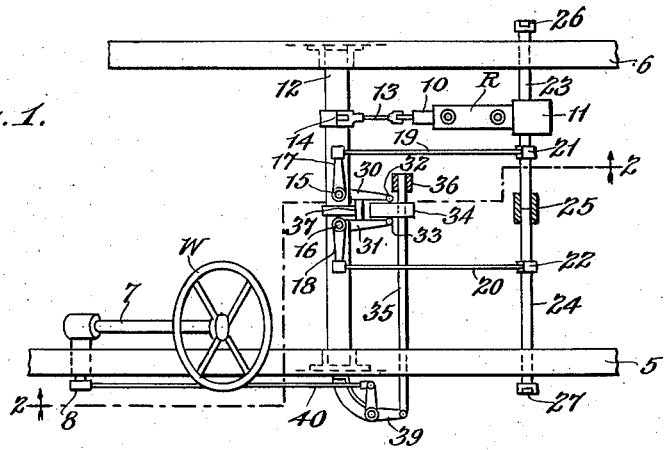
Fig. 1 is a top plan view of a portion of a vehicle frame or chassis and steering mechanism showing a mechanical embodiment of the shock absorber resistance regulating means applied thereto.
Figure 2:
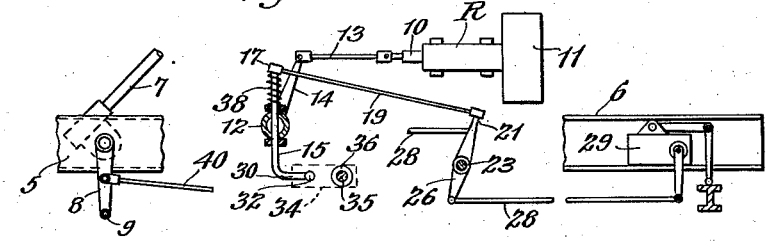
Fig. 2 is a vertical sectional view taken substantially on the line 2—2 of Fig. 1.

Referring more particularly to Figs. 1 and 2 of the drawing, 5 and 6 indicate the opposite longitudinal side rails of a vehicle frame or chassis. The steering gear, generally indicated at 7 includes the steering arm 8 which is provided at its lower end with the usual ball or knuckle shown at 9 for connection with the front axle steering mechanism (not shown).

A brake pressure regulating device, generally indicated at R, having a movable pressure regulating valve 10 actuated by inertia responsive means in the casing 11, is operatively connected with a cross shaft 12 oscillatably supported at its opposite ends upon the side rails 5 and 6. This connection may comprise the link 13 connected at one of its ends with the movable valve member 10 and having its other end connected with the upstanding arm 14 fixed to the shaft 12. Since this brake pressure regulating device R is fully shown and described in my co-pending application, it need not be herein further referred to in detail.

At opposite sides of its center, vertically disposed rods 15 and 16 respectively are oscillatably mounted in the shaft 12. At their upper ends these rods are provided with the fixed arms 17 and 18, normally extending in opposite directions and in parallel relation with the shaft 12. Rods 19 and 20 respectively operatively connect the arms 17 and 18 with similar arms 21 and 22 fixed at their lower ends respectively to the independently operable rock shafts 23 and 24. These shafts are arranged in axial alignment with each other and have their inner ends mounted in a central supporting bearing 25, the outer ends of said shafts being mounted in suitable bearings on the frame rails 5 and 6 and projecting beyond said rails. To the latter end of each shaft 23 and 24 lever arms 26 and 27 respectively are fixed and extend above and below the shaft axis. The lever arms at each side of the vehicle frame are connected by means of the forwardly and rearwardly extending rods, indicated at 28 with rotatable resistance control valves of a standard type of fluid shock absorber mounted on the vehicle frame near its opposite ends. One of these shock absorbers is indicated at 29, and may be of the construction shown and described in patent to Seaholm No. 2,033,034, December 3, 1935.

Each of the rods 15 and 16 is further provided at its lower end with a laterally projecting arm 30 and 31 respectively, said arms extending at right angles to the arms 16 and 17 and being provided with spherical or ball terminals 32 and 33 respectively for bearing engagement against the opposite side faces of an actuating member 34. This actuating member is fixed to a transversely shiftable shaft 35 having its inner end supported in a suitable bearing 36. A fixed stop 37 is positioned between the arms 30 and 31 and limits movement of said arms to the normal positions shown in the drawing. It will thus be evident that this stop prevents clockwise rotation of the rod 15 and counter-clockwise rotation of the rod 16 from such normal positions. Rotation of the rods is yieldingly resisted by suitable springs, one of which is shown at 38 in Fig. 2, which yieldingly urge the spherical ends of the arms 30 and 31 into contact with the member 34.

The shaft 35 at its outer end is connected with one arm of a bell crank lever 39, the other arm of which is connected by rod 40 with the steering arm 8.

With reference to the foregoing description, the operation of the invention will be understood as follows:

Assuming that the driver desires to make a right hand turn, he imparts a clockwise rotation to the steering wheel W which results in a counter clockwise movement of the arm 8 and a rearward movement of the rod 40, thus imparting clockwise rotation to the bell crank 39 and moving the rod or shaft 35 outwardly. In such movement, the member 34 bearing against arm 31 causes a clockwise rotation of rod 16 so that arm 18 exerts a pull on the rod 20, thus rocking shaft 24 and actuating the resistance regulating valves of shock absorbers 29 on the steering gear side of the vehicle. This of course will be the outer side in making a right hand turn where the centrifugal force will tend to compress the body supporting springs. However, this is anticipated by the actuation of the resistance control valves in the rotation of the steering wheel which increases resistance of the shock absorbers to the compression of the vehicle springs. In such movement of the actuating member 34 to rotate the rod 16, the other rod 15 remains stationary as its arm 30 is engaged with stop 37 so that shaft 23 is not actuated and the resistance of the shock absorbers at the inner side of the vehicle remains undisturbed.

Of course it will be evident that when the wheel W is rotated in a counter-clockwise direction in making a left hand turn, the rod 15 and its connections with the shaft 23 are actuated to modify the resistance of the shock absorbers on the frame rail 6, while the rod 16 and rock shaft 24 remain stationary.

When the brakes are applied and the brake pressure regulating device R is actuated, as the regulating valve 10 moves forwardly, shaft 12 is rocked in a counter clockwise direction, and both of the rods 15 and 16 and the parts connected therewith, move as a unit with said shaft, thereby simultaneously rotating both rock shafts 23 and 24 to actuate the resistance control valves of the shock absorbers on both sides of the vehicle, thus modifying the reaction of the vehicle suspension system to counteract the undesirable effects of inertia force on the vehicle body when the brakes are applied. In such operation of the resistance regulating means for the shock absorbers, independently of the operation of the steering mechanism, there is sufficient surface area of the member 34 so that the ends of the arms 30 and 31 will remain in contact therewith during the oscillating motion of the shaft 12.

Figure 3:
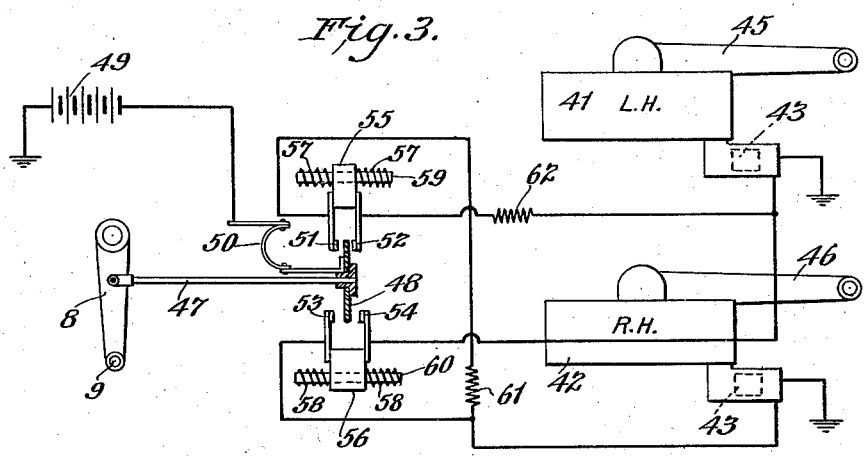
Fig. 3 is a diagrammatic view showing a modified form of the invention as used in connection with electrically actuated resistance regulating valves for the shock absorbers.

In Fig. 3 of the drawing, I have illustrated a modification of the invention, in which the shock absorbers 41 and 42 on each side of the vehicle are provided with electrically actuated resistance control valves as fully described in my above identified co-pending application, the solenoids 43 being located at the compression ends of the shock absorbers. Of course, each shock absorber has the usual operating arms 45 and 46 respectively for connection with one of the vehicle axles. The operating solenoids for the resistance control valves are energized in the following manner.

One end of the rod 47 is connected with the steering arm 8, and a circuit closing disk 48 is suitably secured to the other end of this rod and insulated therefrom. Electric current from battery 49 is supplied to the disk 48 through the flexible cable 50, and the marginal portion of said disk is interposed between and normally spaced from upper and lower pairs of contacts 51, 52 and 53, 54 respectively. Each pair of contacts is fixed to an insulating block 55, 56 respectively with which the opposing springs 57 and 58 are engaged to yieldingly resist movement of said insulating blocks from a central position on the supporting rods 59 and 60 respectively.

From the diagram, it will be evident that if the steering mechanism is operated to make a left hand turn, the steering arm 8 will move forwardly or to the left, thus causing contact between the disk 48 and the contact 51. Current will then flow through a resistance 61 in the circuit connections with the solenoid 44 whereby the resistance control valve of the shock absorber 42 at the right side of the vehicle is actuated to counteract the effects of centrifugal force to compress the body supporting springs on that side of the vehicle. Owing to the passage of the current through the resistance 61, the solenoid 44 will not be fully energized, and therefore the resistance valve will not be fully actuated to establish maximum resistance to the functional operation of the shock absorber. It will be noted that the lower contacts 53 and 54 are spaced apart for a greater distance than the upper contacts 51 and 52. Thus when a further movement of the steering arm 8 occurs to make a shorter or sharper turn of the vehicle, the movement of disk 48 to the left continues and the upper contacts with the insulating block 55 move therewith against the action of one of the springs 57 until said disk engages the lower contact 53. Thereupon, the resistance 61 is short-circuited so that the full strength of the current is supplied to the solenoid 44 to further actuate the resistance control valve of shock absorber 42 and produce maximum resistance of said shock absorber to compression of the vehicle springs on the right hand side of the vehicle.

In making a right hand turn, the disk 48 will first engage contact 52 and current will then be supplied to the solenoid 43 through resistance 62 in the current supply circuit for said solenoid to thus produce an initial resistance to the operation of the shock absorber on the left hand side of the vehicle, and when the steering mechanism is further operated, disk 48 will then engage contact 54 to short-circuit resistance 62 and further energize solenoid 43 to increase resistance of the shock absorber on the left hand side of the vehicle to the maximum degree, and thus anticipate the effects of centrifugal force to compress the vehicle body supporting springs on this side of the vehicle.

It will be apparent from the foregoing description that both the mechanical and electrical types of apparatus which I provide for automatically anticipating the effects of centrifugal force to unduly compress the vehicle body supporting springs and resist displacement of the vehicle body from a normal condition of more or less stable equilibrium, will be highly efficient and reliable in practical operation.

In the drawing I have shown only the right and left hand shock absorbers at one end of the vehicle, but it will be understood that the electrical valve operating means for the shock absorbers at the other end of the vehicle will have their corresponding circuits connected with the battery 49, in series with the circuits illustrated in the drawing.

In case of a vehicle having a three-point mounting, where the vehicle body is centrally pivoted on a front axle or other support, stability of the vehicle in making sharp turns will be materially increased by the use of the mechanism shown in Fig. 1. In such a vehicle, no stiffening effect would be obtained by the pivoted front axle or its equivalent, and my invention will largely neutralize the slight pitching tendency in making a turn, which has a disagreeable effect upon the occupants of the vehicle.

From the foregoing description considered in connection with the accompanying drawing, the construction, manner of operation and several advantages of the described embodiments of the invention will be clearly understood. It will be appreciated that the device embodies relatively few parts of simple mechanical construction which may be produced and installed in the manufacture of the vehicle at more or less nominal additional expense. An automatically operating mechanism of this kind provides an additional factor of safety in the operation of motor vehicles, and minimizes the possibility of accidents when driving at high speeds.

I have herein disclosed several practical embodiments of the present invention, but it will be apparent that the essential features thereof may also be exemplified in various other alternative structural forms, and I accordingly reserve the privilege of resorting to all such legitimate changes in the construction, combination and relative arrangement of the several parts as may fairly be considered to be within the spirit and scope of the appended claims.

I claim:

1. In a motor vehicle, a hydraulic shock absorber on each side of the vehicle, each having means to modify the resistance thereof, independently operable actuating means individual to the resistance modifying means of the respective shock absorbers, a common operating means for independently operating said actuating means and additional means operatively connected with both of said actuating means to operate the same and simultaneously modify the resistance of the shock absorbers on both sides of the vehicle.

2. In a motor vehicle, steering mechanism, a hydraulic shock absorber on each side of the vehicle, each having means to modify the resistance thereof, independently operable actuating means individual to the resistance modifying means of the respective shock absorbers, a common operating means for independently operating said actuating means, operatively connected with and actuated by the steering mechanism and additional means operatively connected with both of said actuating means for the resistance modifying means of the shock absorbers on both sides of the vehicle to simultaneously operate the same independently of the steering mechanism.

3. In combination with a motor vehicle having a braking system and a suspension system including a shock absorber on each side of the vehicle and each provided with resistance regulating means; means connected with and operatively controlled by the steering mechanism for selectively actuating the regulating means of shock absorbers on opposite sides of the vehicle to increase the resistance thereof in anticipation of the effects of centrifugal force upon the stabilizing function of the suspension system, and additional means automatically responsive to an application of the vehicle brakes for operating said actuating means to simultaneously operate the resistance regulating means of shock absorbers on both sides of the vehicle, independently of the steering mechanism.

4. In combination with a motor vehicle having a braking system and a suspension system including a shock absorber on each side of the vehicle and each provided with a resistance regulating means; means for selectively actuating the regulating means of shock absorbers on opposite sides of the vehicle, and additional means automatically responsive to an application of the vehicle brakes for operating said actuating means to simultaneously operate the resistance regulating means of the shock absorbers on both sides of the vehicle.

5. In a motor vehicle, a yieldable body suspension unit on each side of the vehicle having means to modify the resistance thereof, means individual to the respective suspension units for selectively actuating the resistance modifying means thereof, and additional means operatively connected with both actuating means to simultaneously operate the resistance varying means of the suspension units on both sides of the vehicle.

AUSTIN M. WOLF.